United States Patent Office 3,809,593
Patented May 7, 1974

3,809,593
METHOD AND APPARATUS FOR THE CONTINUOUS MANUFACTURE OF COLLAPSIBLE CELLULAR PARTITIONS
William R. Burke and Frank S. McCall, Savannah, Ga., and Kenneth G. Clark, Pennington, Ernest T. De Pass, Bound Brook, and William H. Friend, Edison, N.J., assignors to Union Camp Corporation, Wayne, N.J.
Continuation-in-part of application Ser. No. 739,300, June 24, 1968, now Patent No. 3,580,471, dated May 25, 1971. This application May 14, 1971, Ser. No. 143,391
Int. Cl. B32b 31/00
U.S. Cl. 156—257    2 Claims

ABSTRACT OF THE DISCLOSURE

The formation of a collapsible cellular partition module by spacing parallel sheets and locating therebetween parallel, longitudinally extending wall sheets, each wall sheet having one longitudinal edge secured to one spaced sheet and the other edge secured to the other spaced sheet. For the continuous manufacture of such modules, the spaced sheets are formed by two moving webs to which longitudinal glue lines are applied. The wall sheets are formed by webs moving between and with the first webs. The wall sheet webs are slit from a single stock roll and are scored to form longitudinal flaps to adhere to the glue lines on the respective first two webs. The first two webs are scored to form the outer wall portions of the partition module. A partition structure of desired size may be built up by assembling the required number of partition modules, the modules being secured to each other by glue areas on their spaced sheets. The partition structure may then be secured in a collapsed position within a collapsed container and both shipped as an integrated package unit for simultaneous setup.

---

This application is a continuation-in-part of the copending application of Burke and McCall Ser. No. 739,300, filed June 24, 1968, now U.S. Pat. No. 3,580,471, issued May 25, 1971.

This invention relates to the method and apparatus for continuously making collapsible cellular partition units.

An object of this invention is to form a collapsible cellular partition unit of suitable weight paper or other flexible sheet material wherein the cells are formed by two spaced sheets and a plurality of wall sheets secured to the spaced sheets.

Another object is to vary the number of cells in a unit by merely varying the number of wall sheets.

Another object is to assemble a partition unit in a continuous process with conventional scoring, gluing, slitting and similar means.

A further object is to secure the wall sheets to the spaced sheets by glue lines and flap means which can be applied and formed by conventional means in a continuous manner.

Another object is to form the partition unit by a continuous process by assembling the several sheets forming the unit in the form of moving infolding webs and, thereafter, cutting off a proper sized unit from the assembled web.

A further object is to use the formed unit as a module to assemble collapsible cellular partition structures of any size or shape. This is accomplished by merely securing the required number of units into the desired size structure. This eliminates the necessity of keeping many separate sizes of partitions.

A further object is to integrate the partition and its container in their collapsed position for ease of shipping and economy in assembling. The integration is accomplished by gluing the outer walls of the partition to the walls of the container whereby it acts as a load-receiving member as well as an article separating member.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which.

Figure 11:
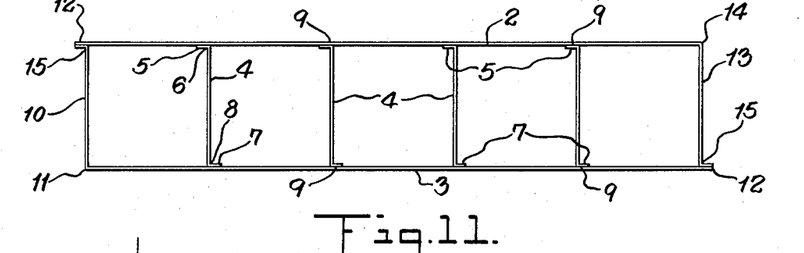
FIG. 11 is a sectional view showing the form of a fully expanded module.
Figure 12:
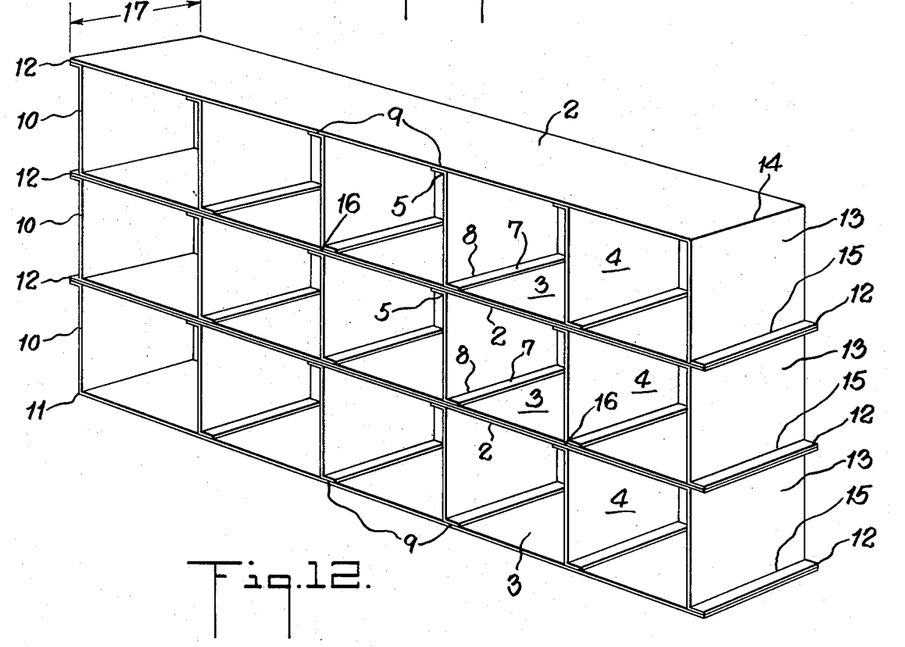
FIG. 12 is a perspective view showing a fully expanded partition structure.

FIG. 12 discloses the structure of a collapsible cellular partition unit covered by the claim of the Burke and McCall Pat. No. 3,580,471 and made by the method and apparatus of the present invention. Such unit is formed from a plurality of modules (FIG. 11). While a module 1 of five cells is shown, the structure may be made of any desired number of cells by merely increasing the wall sheets. Similarly, the number of modules stacked up can be varied to form a unit of any desired cell numbers in either dimension.

The modules of the unit comprise top sheet 2, bottom sheet 3 and a plurality of wall sheets 4 secured to sheets 2 and 3. The terms "top" and "bottom" are merely relative and are used for descriptive purposes only. The longitudinal edges of a wall sheet 4 terminate in flaps 5 and 7 along score lines 6 and 8, respectively. As shown in the figures, flaps 5 and 7 extend in opposite directions and form a Z formation with the body of wall sheet 4.

The wall sheets are secured by flaps 5 and 7 to sheets 2 and 3 at areas 9. The securing means may assume any form but preferably is formed by a suitable glue line or pattern along sheets 2 and 3 at areas 9; that is, the areas at which flap 5 contacts sheet 2 and flap 7 contacts sheet 3. Thus, as sheets 2, 3 and 4 pass through the assembly machine, as will be later described, the several sheets are secured together as shown in FIGS. 11 and 12. The longitudinal dimension of the unit, i.e., the depth of the cells, is determined by the length of the packaged articles. The individual units are cut to the desired longitudinal dimension of the assembled web of sheets 2, 3 and 4.

To complete a unit, bottom sheet 3 terminates along a longitudinal edge in a wall portion 10 along a score line 11. The top sheet 2 has a similar wall portion 13 along a score line 14. Wall portions 10 and 13 terminate in flaps 12 along score lines 15. As shown in FIGS. 11 and 12, flaps 12 are secured, as by glue lines, to the portions of the outer cover sheet lying opposite the respective flaps, whereby wall portions 10 and 13 become the outer wall sheets of the partition unit.

Figure 10:
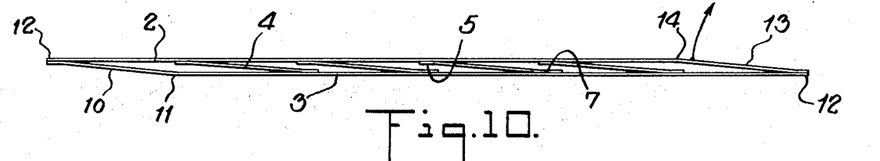
FIG. 10 is a sectional view showing the form of a module in flat form.

The longitudinal dimension 17 of a partition unit, i.e., the depth of the cells, is determined by the length of the packaged article, the individual units are cut off from the web assembly of sheets 2, 3 and 4 as it emerges from the fabricating machine. The cut off module 1 is in collapsed position as shown in FIG. 10. FIG. 11 shows it in the erected position, wherein the article receiving cells are formed by sheets 2, 3 and 4.

To form a collapsible cellular partition structure of any desired size, the necessary number of units or modules are superimposed, collated and secured together to form the desired size partition structure. FIG. 12 shows an assembly of the modules. Modules 1 are secured to each other by glue lines along areas 16 between sheets 2 and 3 of the several units. The glue pattern may assume any size, area or shape. It depends upon the size and weight of the packaged articles, the amount of support required and the strength of the container. The showing of glue areas 16 in FIG. 12 is merely exemplary and comprises the area covered by a pair of adjacent flaps 5 and 7. The end glue area may be the extent of a single flap.

In superimposing modules 1 on top of each other, it is necessary to offset each unit one cell from the unit below it. This is clearly shown in FIGS. 7 and 8 wherein the middle module 1 is offset a distance of a cell from the bottom unit, and the top unit is similarly offset from the middle unit. Thus, when the assembly is brought to the erected position shown in FIG. 12, the assembly assumes a rectangular shape with straight walls.

Figures 1, 4, 5:
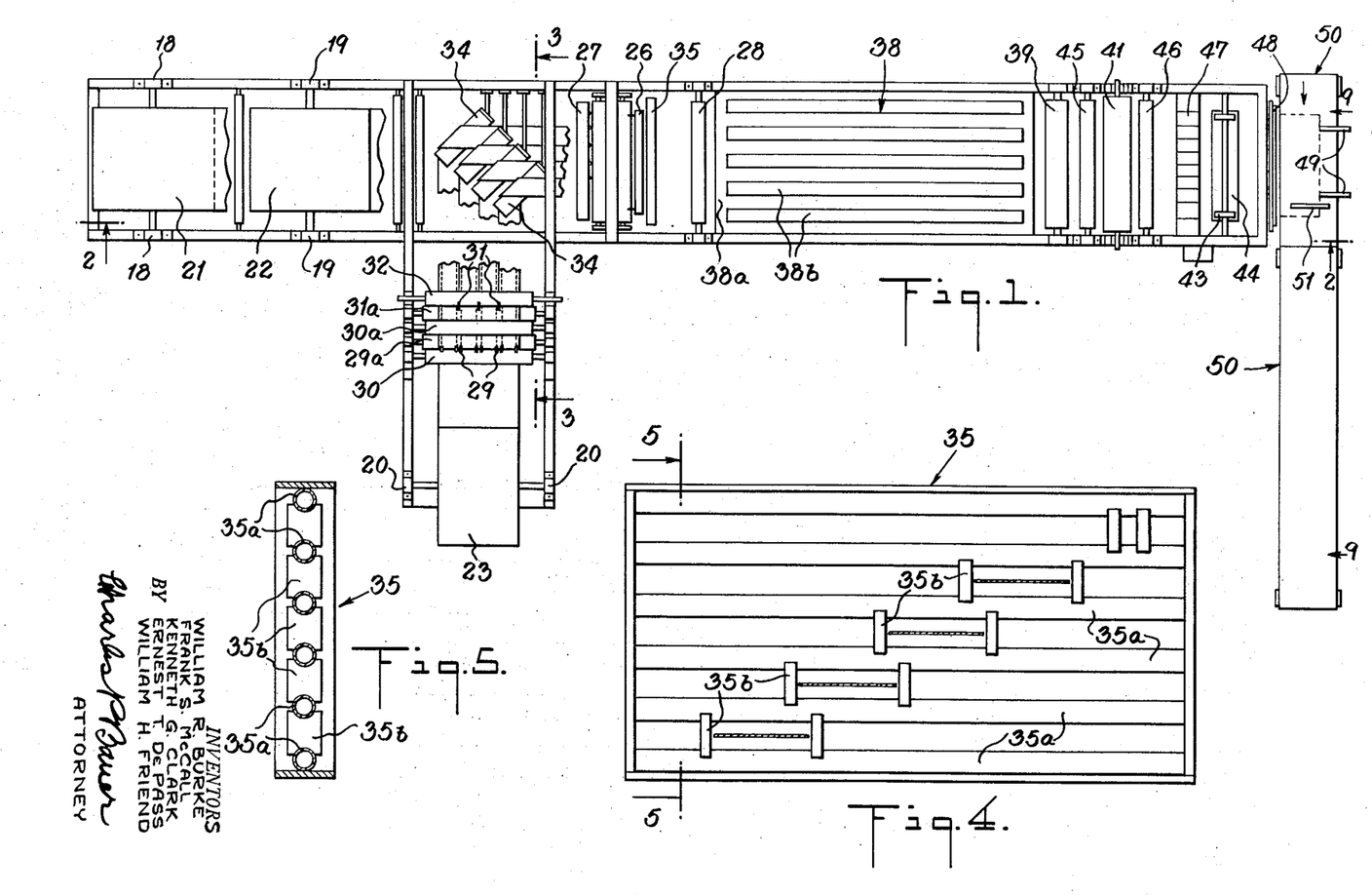
FIG. 1 is a top view of a machine for fabricating the partition unit in a continuous manner.
FIG. 4 is a front view of the edge guiding device for positioning each strip with respect to the other strips before joining such strips and combining them with the spaced parallel sheets.
FIG. 5 is a sectional view along the line 5—5 of FIG. 4.
Figure 2:
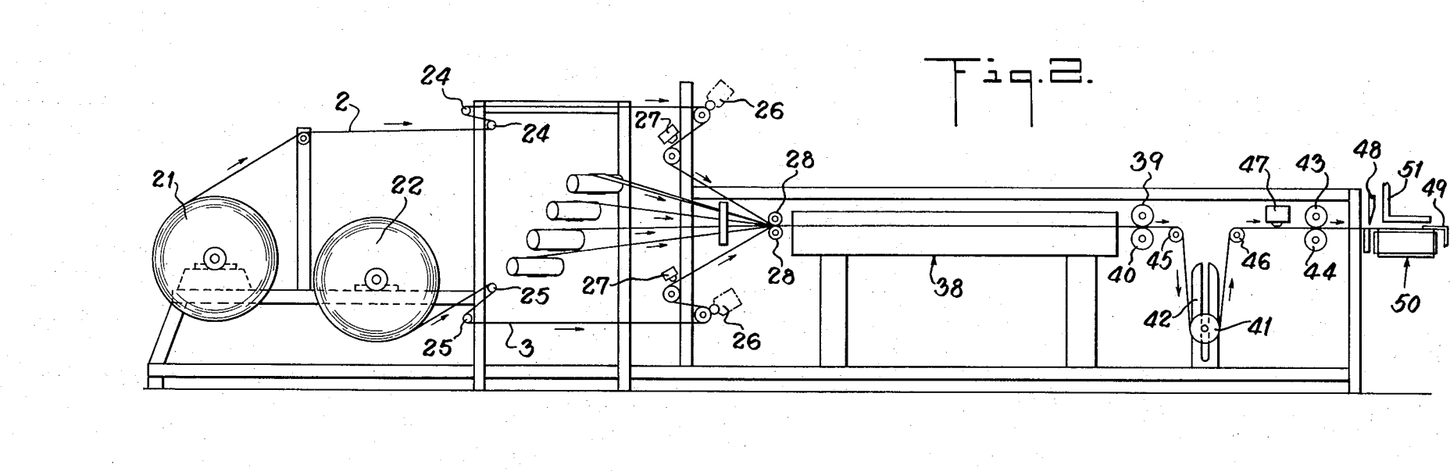
FIG. 2 is a sectional view along the line 2—2 of FIG. 1.

Referring to FIGS. 1 and 2, there are three unwind stands 18, 19 and 20 on which are mounted rolls of paper 21, 22 and 23. The top sheet 2 for the modules is fed from roll 21 and the bottom sheet 3 from roll 22. The strips for the wall sheets 4 are cut from the roll of paper 23. The unwind stands have provision for lateral adjustments of the rolls so that the webs of paper coming from the rolls are properly aligned. All of the webs run through brakes for applying tension to the webs. Such brakes are shown in as 24 and 25 for the webs 2 and 3 in FIG. 2.

The top and bottom sheets 2 and 3 are each scored on their outer edges by a pair of scoring rolls 26 after which lines of adhesive are applied by adhesive applicators 27. The adhesive nozzles are adjustable so that the position of the lines of adhesive can be varied to form different cell sizes. The sheets then run to a pair of spaced rollers 28 where the sheets are combined with the strips forming the wall sheets 4.

Figure 3:
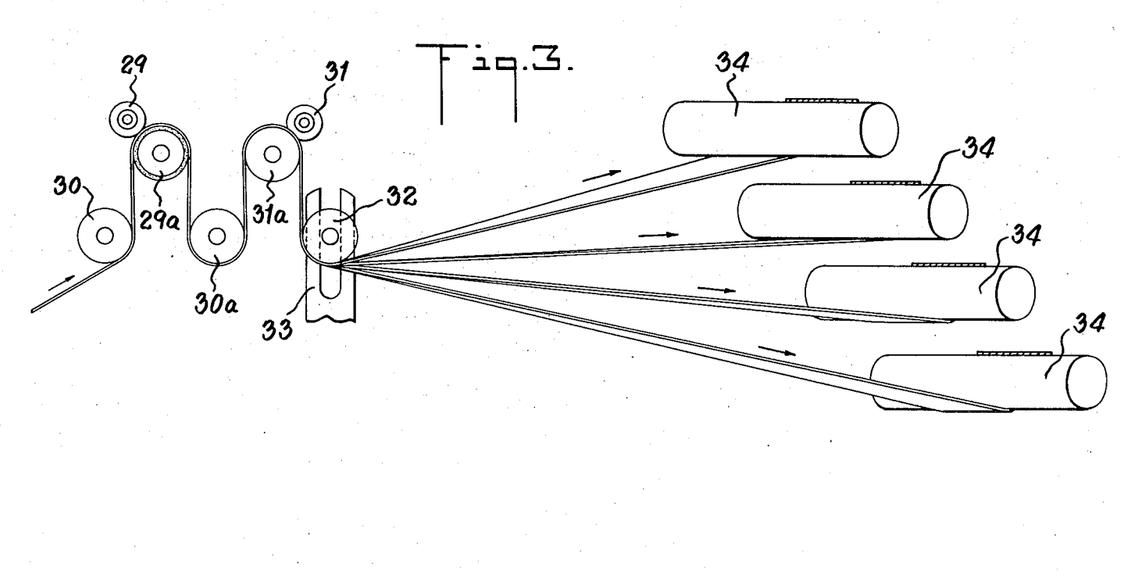
FIG. 3 is a sectional side view along the line 3—3 of FIG. 1.
Figure 6:
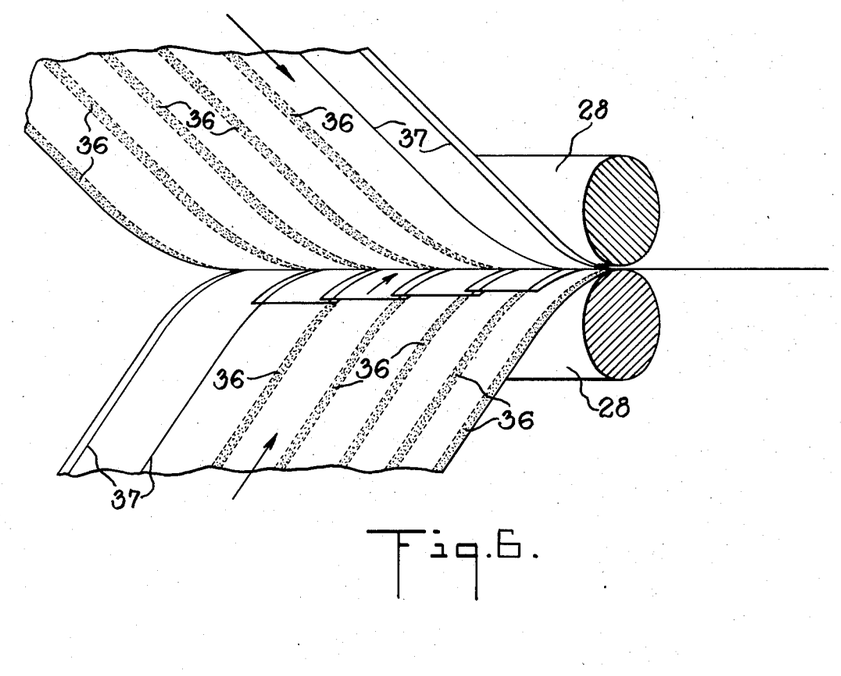
FIG. 6 is an enlarged perspective view showing the joining of the strips and combining them with the spaced parallel sheets.

Referring to FIG. 3 the web from the roll 23 runs under guide roll 30 and is scored from the top by a scoring roll 29 running against a urethane covered roll 29a. The web then passes under guide roll 30a to a pair of slitting rolls 31 and 31a where the web is cut into the strips for the wall sheets 4. The strips then pass under a dancer roll 32 which can move up or down in slotted members 33 to provide the proper tension on the moving strips. The strips are fed over turning bars 34 which are set at a 45-degree angle but are adjustable laterally so that any strip can be approximately spaced from its adjacent strip. The rolls 29a and 31a are driven to feed the strips at very low tension to the turning bars. The strips pass through an edge guiding device 35 (FIGS. 4 and 5) which positions each strip with respect to the other strips, the top and bottom webs and the glue lines on such webs, and assures proper cell configuration. Such device is made up of a series of horizontal parallel bars 35a with vertical parallel spacers 35b between the bars with the spacers separated the width of the strips for the wall sheets 4.

Figure 9:
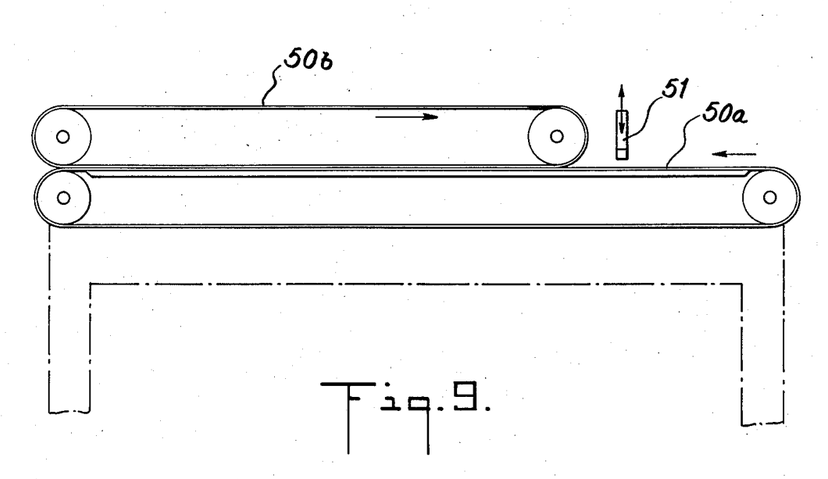
FIG. 9 is a sectional view along the line 9—9 of FIG. 1.

The top and bottom sheets 2 and 3 and the strips for the wall sheets 4 are combined between the spaced rollers 28 prior to entry into the hot plate section. The adhesive pattern and the combining of the sheets and strips is illustrated in FIG. 9 where the glue lines are designated as 36 and the score lines as 37. It will be noted that the central lines secure the strips to the top and bottom sheets whereas the edge lines bond the top and bottom sheets together at both edges.

The combined sheets and strips pass into a hot plate section 38 which has a flat heated bottom table 38a and a series of heated bars 38b running lengthwise above the bottom table. Such bars can be adjusted laterally so that they will be aligned over the glue lines of the assembled sheets. Such assembled sheets are fed between the bottom table 38a and the top bars 38b. The heat and pressure provided by these bars against the bottom table serve to cure the adhesive and set the bonds. At the end of the hot plate section the assembled sheets are completely combined.

The drive rolls 39 and 40 operate continuously and pull the webs and strips through the previously described stages of the machine. From these drive rolls the combined sheets pass under a dancer roll 41, which can move up or down in slotted members 42, to accumulate the continuously moving combined sheets before they move to the intermittent cutting section. The sheets are moved to such cutting section by the drive rolls 43 and 44 which stop and start in synchronism with the cutter. The speed at which these rolls are driven is adjustable to provide different cut-off lengths. Such drive rolls are spaced to avoid the adhesive lines. Guide rolls 45 and 46 convey the sheets to and from the dancer roll.

Figure 8:
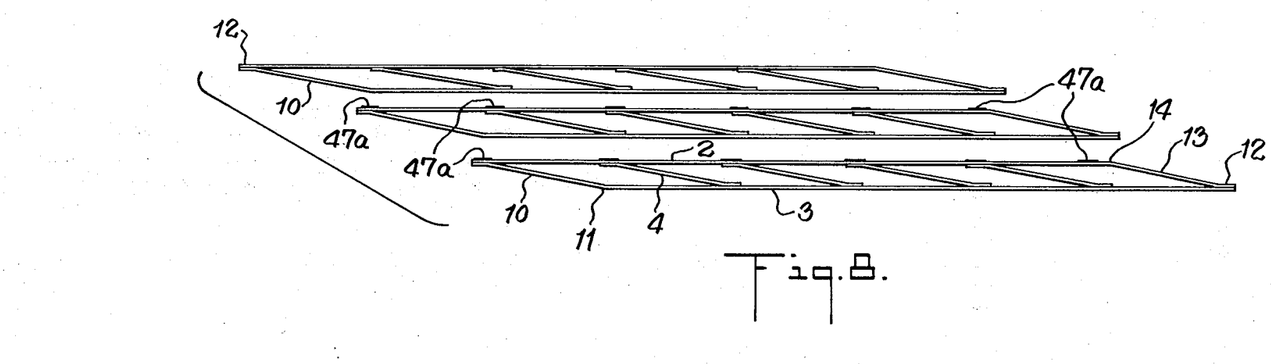
FIG. 8 is a sectional view showing the paste patterns for combining the modules to form a partition structure.

After leaving the dancer roll the sheets pass under an adhesive applicator 47 which applies lines of adhesive 47a to the top of the combined sheets in synchronism with the cutter. The adhesive is only applied during the period when the sheets are moving. The control of this adhesive applicator is provided with a counting device so that the application of adhesive can be omitted or skipped. For example, if three modules are to be ultimately combined, the application of adhesive would be omitted every third cycle. The adhesive applicator 47 can be adjusted laterally so that the lines of adhesive can be aligned with the lines of adhesive combining the strips with the top and bottom sheets. The applicator can also be adjusted longitudinally in the machine direction so that gaps in the adhesive lines can be synchronized with the line along which the sheets will be cut so that the knife will not be messed up with adhesive. FIG. 8 illustrates the adhesive pattern used for combining the modules.

Figure 7:
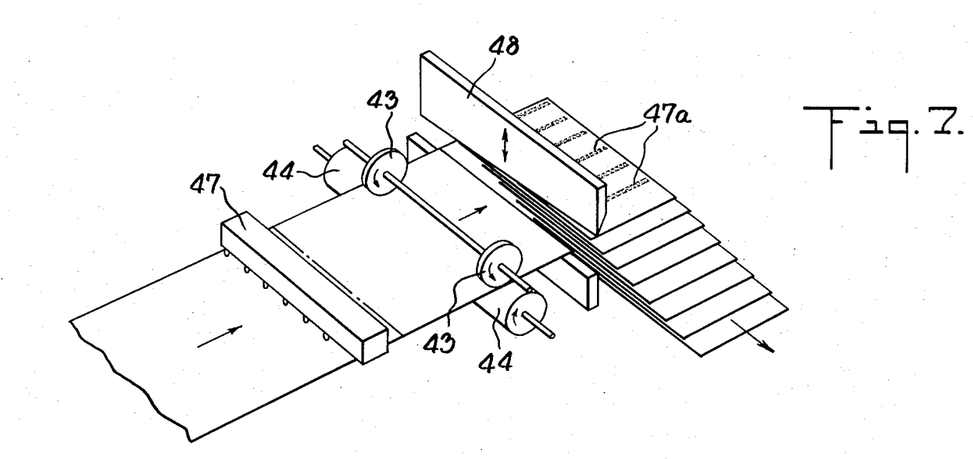
FIG. 7 is a perspective view of the back end of the machine showing the cutter for severing the combined sheets into modules.

Referring to FIG. 7, a guillotine type cutter 48 severs the combined sheets during the period when the sheets are stopped. The knife is raised to allow passage of the sheets during the period when the sheets are moving. Adjustable stops 49 limit the distance the sheets move onto the conveyor section 50 before the cutter comes down to sever the sheets. After cutting the sheets into a module, the module drops in register onto a previously cut module which in turn with other previously cut modules lies on the lower belt 50a of the conveyor section. To assure that the stacked modules will remain in registry a tamper 51 moves downwardly simultaneously with the knife 48 and applies pressure to the top module on at least one of the adhesive lines.

The lower belt 50a of the conveyor section 50 not only serves as a support for the stacked modules but also provides proper module to module registration. The upper belt 50b of the conveyor section 50 applies pressure to the stacked modules and serves as a compression section for curing the module to module adhesive. The conveyor operates in synchronization with the cutting section. It moves when the webs move through the draw rolls and is stationery during the cutting operation. The amount the conveyor moves is adjustable and is equal to the width of a cell. FIG. 12 illustrates the form of the cellular partition structure after it comes off the conveyor section and has been fully expanded.

Figures 13, 14:
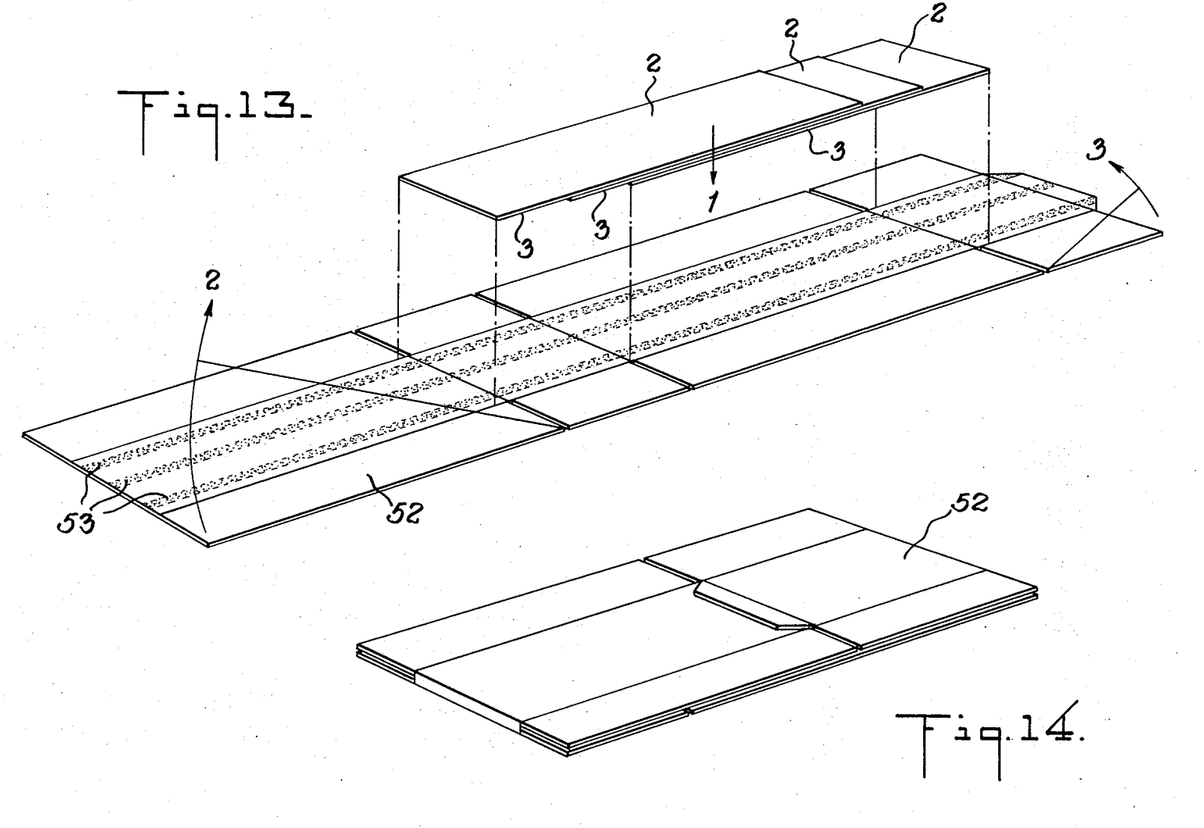
FIG. 13 is a perspective view showing a flat partition structure being positioned on a flat carton blank.
FIG. 14 is a perspective view showing the carton blank of FIG. 13 after being folded into a tube.
Figure 15:
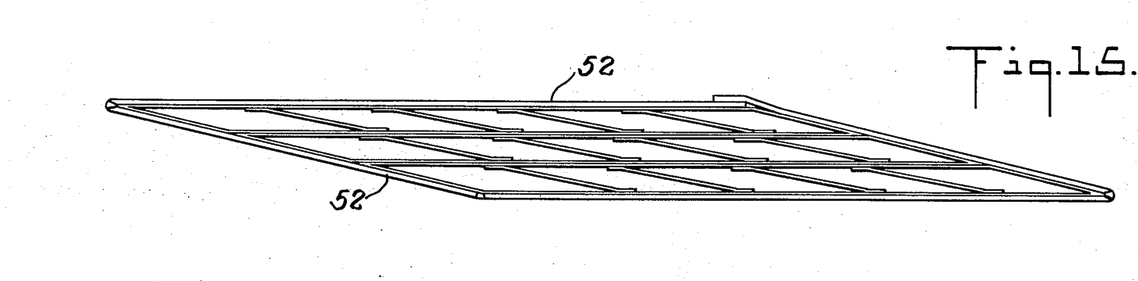
FIG. 15 is a sectional view of the combined carton and partition structure of FIG. 14 in partially expanded form.
Figure 16:
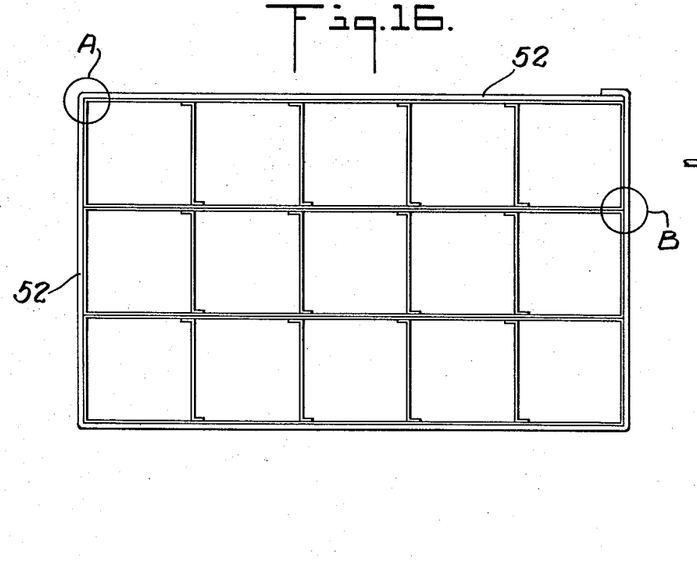
FIG. 16 is a sectional view similar to that of FIG. 15 with the combined carton and partition structure fully expanded.
Figure 17:
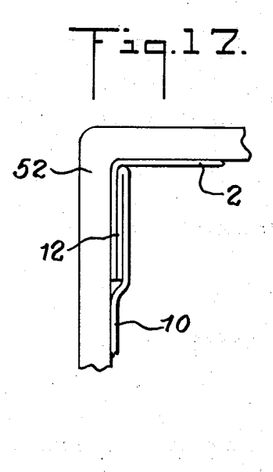
FIG. 17 is an enlarged sectional view of the joint shown in the circled area A of FIG. 16.
Figure 18:
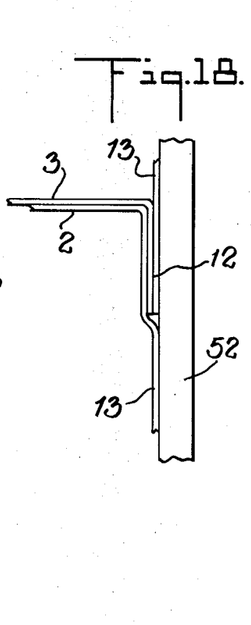
FIG. 18 is an enlarged sectional view of the corner shown in the circled area B of FIG. 16.

FIG. 13 illustrates the manner of securing the partition structure to a box blank 52. Adhesive lines 53 are applied to all four panels of the blank after which the partition structure is placed over two of the panels and the two panels are superimposed over the partition structure (FIG. 14). Thus the structure is secured to all four panels of the blank as shown in FIGS. 15 and 16. FIGS. 17 and 18 illustrate respectively the folding of the module flaps 12 in a corner and along a side of the partition structure when such structure is glued in the carton. The combination box blank and partition is in knockdown collapsed condition for shipping. The customer receiving this combination merely has to set up the box, secure the bottom box flaps, insert the product in the cells, and fold and secure the top box flaps.

The gluing in of the partition all along the walls integrates the partition as a load-carrying member of the container unit. Furthermore, the wall sheets act as tie members between the outer walls of the container so that such walls will not bulge outward when the container is filled. Thus, the partition adds to the strength and to the rigidity of the overall package.

Coming assembled with the collapsed container, the disclosed partition arrangement saves time in carton setup, saves storage space and offers other obvious advantages over the arrangement wherein the partitions and containers are separately shipped and assembled.

Of course, if desired, the instant partition assembly may be shipped and used separately from the container in the usual manner.

The method and the operation of the apparatus for fabrication of the collapsible cellular partition modules and the combining of such modules into a partition structure in a continuous manner should be clear from the foregoing description. The method and apparatus provide the means for producing such structure in a simple, economical and effective manner.

Thus, among others, the several aforenoted objects and advantages are most effectively attained. Although a somewhat preferred embodiment of the invention has been disclosed and described in detail herein, it should be understood that this invention is in no sense limited thereby and its scope is to be determined by that of the appended claims.

Having described the invention, what is claimed is:

1. A process of fabricating a collapsible cellular partition structure having a plurality of modules forming substantially rectangular cells in longitudinal rows comprising the steps of:
    feeding a top continuous sheet from a roll supply of flexible material;
    feeding a bottom continuous sheet from a roll supply of flexible material in the same direction and rate as the top sheet;
    feeding a continuously slit web between the top sheet and the bottom sheet, the slitted webs constituting flexible wall sheets between the top and bottom sheets;
    enfolding the plurality of flexible wall sheets between the two spaced top and bottom flexible sheets;
    securing by glue lines a longitudinal edge of each of the wall sheets to the top sheet;
    securing by glue lines the opposite longitudinal edge of the wall sheet to the bottom sheet;
    securing by glue lines opposite longitudinal edge portions of said top and bottom sheets;
    cutting the bonded assembly which emerges from the bonding and pressing step to a predetermined length constituting the collapsible cellular partition module;
    superimposing cut modules upon each other, each module being offset from its adjacent lower module by a distance equal to the height of a cell; and
    bonding the superimposed layers with glue between top and bottom sheets of adjacent modules;
    the said bonded top and bottom sheets of adjacent modules remaining in flat relationship to each other and providing double sheets between modules when the modules are opened up into the cellular structure;
    whereby the said modules can be opened up into the cellular structure to form a parallelogram with all of the sides generally flat.

2. A process as claimed in claim 1, wherein each of said wall sheets is scored along the edges to provide flap portions, the flap portions being brought into contact with the glue lines on the top and bottom sheets and bonded by pressing; and both top and bottom sheets are scored longitudinally to form the outer wall portions of the module.

References Cited

UNITED STATES PATENTS

| 1,023,989 | 4/1912 | Brown | 93—37 EC |
| 3,056,537 | 10/1962 | Vesak | 229—15 |
| 3,011,672 | 12/1961 | Vesak | 217—30 |
| 3,518,151 | 6/1970 | Ellinor | 156—512 |

DOUGLAS J. DRUMMOND, Primary Examiner

D. A. SIMMONS, Assistant Examiner

U.S. Cl. X.R.

93—37 (R), 37 (EC); 156—259, 260, 264, 291, 548

UNITED STATES PATENT OFFICE
CERTIFICATE OF CORRECTION

PATENT NO. : 3,809,593
DATED : May 7, 1974
INVENTOR(S) : William R. Burke et al

It is certified that error appears in the above-identified patent and that said Letters Patent are hereby corrected as shown below:

Change the inventors to read:

---William R. Burke and Frank S. McCall; Savannah, Ga.---

Signed and Sealed this

Twenty-seventh Day of July 1976

[SEAL]

Attest:

RUTH C. MASON
*Attesting Officer*

C. MARSHALL DANN
*Commissioner of Patents and Trademarks*